(No Model.)
G. R. SMITH.
ANIMAL TRAP.
No. 446,119.    Patented Feb. 10, 1891.
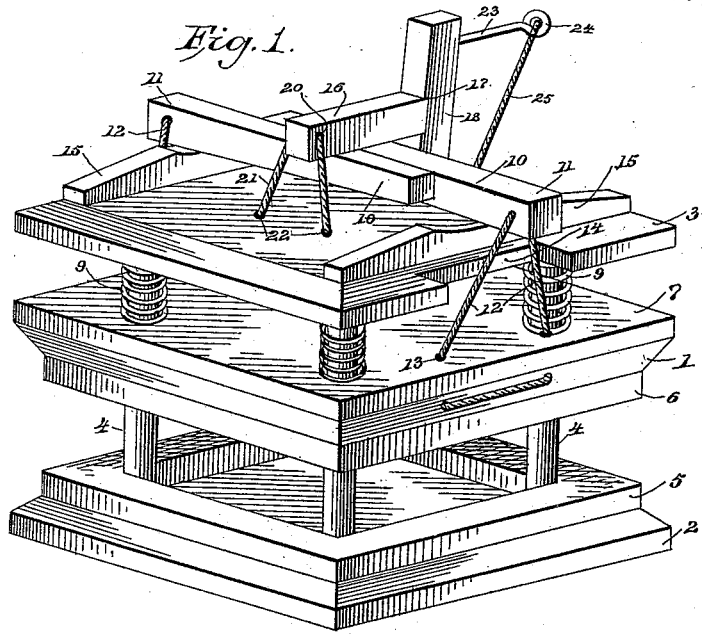
Witnesses
E. M. Gallaher
H. F. Riley
Inventor
Geo. R. Smith
By his Attorneys,
C. A. Snow & Co.

UNITED STATES PATENT OFFICE.

GEORGE R. SMITH, OF BUFFALO, MISSOURI.

ANIMAL-TRAP.

SPECIFICATION forming part of Letters Patent No. 446,119, dated February 10, 1891.

Application filed October 2, 1890. Serial No. 366,877. (No model.)

*To all whom it may concern:*

Be it known that I, GEORGE R. SMITH, a citizen of the United States, residing at Buffalo, in the county of Dallas and State of Missouri, have invented a new and useful Animal-Trap, of which the following is a specification.

The invention relates to improvements in animal-traps.

The object of the present invention is to provide a simple and inexpensive trap for small animals— such as rats, coons, and the like—which are attracted by a bait, adapted to be easily set and readily sprung, and capable of quickly extinguishing the life of the animal.

The invention consists in the construction and novel combination and arrangement of parts hereinafter fully described, illustrated in the accompanying drawings, and pointed out in the claims hereto appended.

In the drawings, Figure 1 is a perspective view of an animal-trap embodying the invention, the trap being set. Fig. 2 is a central vertical sectional view, the parts being in the position shown in Fig. 1. Fig. 3 is a similar view taken at right angles to Fig. 2, the trap being sprung.

Referring to the accompanying drawings, 1 designates a frame consisting of a flat rectangular base 2, a similarly-shaped top portion 3, and four vertical standards 4, rising from the base near the corners thereof and extending to the top and supporting the same. The base is provided on its upper face near its edge with a vertically-extending flange 5, which acts in conjunction with a similar flange 6, arranged on the lower face of a follower 7. The follower 7 is rectangular, and is provided near each corner with a circular opening 8, through which pass standards 4, and the standards 4 are round to serve as guides for the follower, and have coiled upon them springs 9, which are interposed between the follower and the lower face of the top portion 3, and have their lower ends secured to the former and their upper ends bearing against the latter, and when the trap is sprung or adapted to force the follower downward bringing the flanges 5 and 6 together with great force sufficient to break the back of a small animal, such as a rat. The follower is held in its elevated position, when the trap is set, by bars 10, which have their ends 11 perforated and secured to the follower by cords 12, which pass through the perforations 11 of the bars 10, and have their ends, which pass through perforations 13 of the follower, secured together. The opposite edges of the top portion are recessed at 14, and the bars 10 rest upon cleats 15, secured to the top, and the said bars are engaged by a transverse bar 16, which extends across them and engages a recess 17 of a trigger 18, which is pivoted in a slot 19 of the top portion. The transverse bar 16 is provided with a perforation 20, through which passes a cord 21, which also passes through perforations 22 in the top portion and has its ends secured together in a manner similar to the cords 12. Extending horizontally from the upper end 13 is a rod 23, which is provided at its outer end with an eye 24, to which is secured one end of a cord 25, which has its other end provided with a hook 26, depending centrally from the follower and designed to receive the bait and be pulled upon to spring the trap. The follower-block is provided with a central opening 27, through which passes a cord 25, which carries the hook 26.

From the foregoing description and the accompanying drawings the construction, operation, and advantages of the invention will readily be understood.

What I claim is—

1. In an animal-trap, the combination of the frame comprising the rectangular base, the similarly-shaped top portion and the round standards rising from the base at the corners thereof, the rectangular follower provided with a central opening, the bars connected with a follower by cords, the springs arranged on the standards and interposed between the follower and the top portion, the trigger pivoted to the top portion and provided with a recess and having extending outward from it the rod 23, the cords secured to the outer end of the rod and provided with a hook arranged in the central openings of the follower, and the bar 16, secured to the top portion by a cord and arranged to engage the follower-bars and the recess of a trigger, substantially as described.

2. In an animal-trap, the combination of the frame comprising the rectangular base provided near its outer edge with the upwardly-extending flange, the rectangular top portion provided with oppositely-disposed recesses and having cleats secured to its upper face and the standards connecting the base and the top portion, the follower provided with openings and arranged on the standards and having a depending flange arranged near its edges and adapted to engage the flange of the base, the spring arranged on the standards and interposed between the follower and the top portion, the follower-bars 10, connected with the follower by cords, the trigger pivotally mounted in the slot of the top portion and having a recess and provided with the outwardly-extending rod, the cords 25, provided with a hook 26, and the transverse bar arranged to engage the follower-bars and the trigger, substantially as described.

In testimony that I claim the foregoing as my own I have hereto affixed my signature in presence of two witnesses.

GEORGE R. SMITH.

Witnesses:
R. JACK,
J. H. SMITH.